United States Patent [19]
Antonini

[11] Patent Number: 5,027,696
[45] Date of Patent: Jul. 2, 1991

[54] DEVICE FOR AUTOMATIC COFFEE BREWING

[76] Inventor: Michael Antonini, 40 Temple La., Suffern, N.Y. 10901

[21] Appl. No.: 487,194

[22] Filed: Mar. 1, 1990

[51] Int. Cl.⁵ .................. A47J 31/053; A23F 5/00
[52] U.S. Cl. ................................. 99/279; 99/282; 99/318
[58] Field of Search ............... 99/279, 280, 281, 282, 99/283, 316, 295, 297, 317, 318, 319, 299, 322

[56] References Cited

U.S. PATENT DOCUMENTS

| | | | |
|---|---|---|---|
| 1,211,614 | 1/1917 | Morales | 99/317 |
| 1,486,649 | 3/1924 | Ewert | 99/319 |
| 1,873,023 | 8/1932 | Peirce | 99/297 |
| 1,887,848 | 11/1932 | Peirce | 99/319 |
| 3,279,351 | 10/1966 | Cohn | 99/282 |
| 3,339,476 | 9/1967 | De Troya | 99/297 |
| 4,253,385 | 3/1981 | Illy | 99/281 |
| 4,365,544 | 12/1982 | Howitt | 99/297 |
| 4,401,014 | 8/1983 | McGrail et al. | 99/287 |
| 4,867,048 | 9/1989 | Brewer | 99/283 |
| 4,920,868 | 5/1990 | Gehrmann | 99/279 |

*Primary Examiner*—William A. Cuchlinski, Jr.
*Assistant Examiner*—John L. Beres
*Attorney, Agent, or Firm*—Iman Abdallah

[57] ABSTRACT

An automatic coffee maker providing means to reduce the amount of coffee required. A meshed coffee basket containing coffee grounds is lowered into a coffee pot and water stored in the coffee maker fills the pot. A heating element brings the water to a boil steeping the coffee grounds to more efficiently extract the flavorings from the coffee grounds. The coffee basket is automatically raised as directed by a timer included in the coffee maker.

5 Claims, 2 Drawing Sheets

DEVICE FOR AUTOMATIC COFFEE BREWING

BACKGROUND OF THE INVENTION

The present invention generally relates to automatic coffee makers. More particularly, the present invention relates to coffee makers providing means for more efficient use of coffee grounds.

Conventional automatic coffee makers generally utilize a drip process wherein heated water is filtered through coffee grounds and thereafter allowed to drip into a coffee pot for storage and dispensation. The coffee stored in the coffee pot is kept warm by a heating element maintained in heat exchanger relationship with the bottom of the coffee pot. Much of the coffee grounds used in the drip process are underutilized and therefore wasted because all of the flavorings in the coffee grounds are not fully extracted by this method. Thus a greater quantity of coffee grounds is required to brew a stated quantity of coffee than would be necessary if more efficient means were available to extract the flavorings from the grounds.

SUMMARY OF THE INVENTION

The present invention discloses a method and device for automatic coffee brewing that more efficiently extracts the flavorings from coffee grounds by steeping coffee grounds in boiling water. In a preferred embodiment of the device, water is pumped from a water storage receptacle to a coffee pot and a meshed coffee basket is selectively lowered within and raised from said coffee pot. The device generally includes a removable coffee pot and a housing member which receives the coffee pot having a water storage receptacle, means to pump the water from said storage receptacle to said coffee pot, a heating element for said coffee pot, a meshed coffee grounds basket, and means to selectively lower and raise the meshed coffee grounds basket to and from the coffee pot.

An object of the present invention is to provide a coffee brewing device which extracts the flavorings from coffee grounds in a more efficient manner.

Another object of this invention is to provide a coffee brewing device that reduces the amount of coffee grounds required.

It is also an object of the present invention to disclose an improved method of brewing coffee.

These and other objects and advantages of the present invention will be apparent to those skilled in the art from the following description of a preferred embodiment, claims and appended drawings.

DESCRIPTION OF A PREFERRED EMBODIMENT

Figure 1:
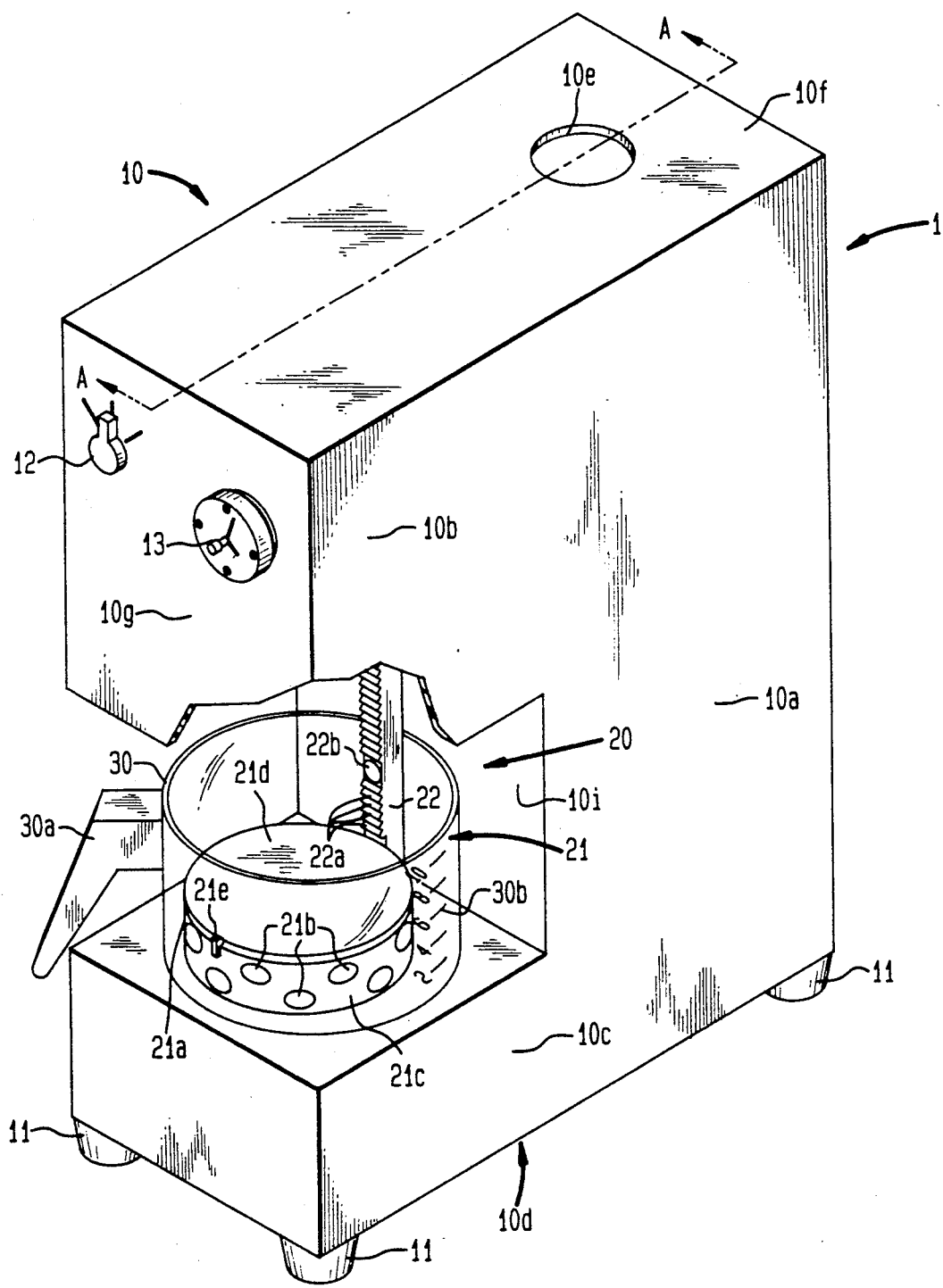
FIG. 1 is a perspective view of the coffee maker device of the present invention.

FIG. 1 illustrates in a perspective view a preferred embodiment of the coffee maker 1 of the present invention. The coffee maker 1 generally includes a housing member 10 having a selectively retractable coffee grounds receptacle unit 20 attached to said housing member 10, and a selectively removable coffee pot 30. Housing member 10 is formed as a substantially C-shaped quadrilateral member having a hollow, rear vertical wall 10a, a hollow top wall 10b forwardly extending from and integrally formed with the top portion of said rear wall 10a, and a hollow bottom wall 10c forwardly extending from and integrally formed with the bottom portion of said rear wall 10a in parallel alignment with said top wall 10b. The housing member 10 is preferably formed from heat-resistant plastic or metal material. Support footings 11 are fixedly attached to the bottom surface 10d of said bottom wall 10c. An opening 10e is provided in the top surface 10f of said top wall 10b which communicates with a water storage receptacle 40 (FIG. 2) disposed within the hollow rear wall 10a of said housing member 10. A three-position switch 12 and a timer 13 are disposed in the forward face 10g of the top wall 10b.

The coffee grounds receptacle unit 20 includes a coffee grounds basket 21 that is retractably disposed within the cavity formed by said top wall 10b and said bottom wall 10c by means of a traveling rod 22 as hereinafter described in greater detail. Coffee grounds basket 21 includes a grounds receptacle 21a having a plurality of finely meshed filters 21b, preferably formed from nylon, formed in the side wall 21c of said grounds receptacle 21a. A grounds receptacle lid 21d is hingedly attached to said grounds receptacle 21a and said receptacle lid 21d is securable to said receptacle 21a by snap fastener means 21e disposed on the side wall 21c of said receptacle 21a and said receptacle lid 21d. Traveling rod 22 is a hollow member having a plurality of vertically spaced teeth 22a formed on one side thereof and a water port 22b formed in the lower portion of said rod 22 to permit the flow of water into said coffee pot 30.

The coffee pot 30 is disposable within the cavity formed by the top wall 10b and the bottom wall 10c in a manner to permit a coffee grounds basket 21 to be selectively raised and lowered therein. In FIG. 1 the coffee grounds basket 21 is shown in its lowered position. Coffee pot 30 includes a coffee pot handle 30a and marked graduations 30b for measuring the amount of coffee to be made. Said coffee pot 30 is preferably formed having a substantially greater diameter than height so that the traveling rod 22 does not have to move upwardly a great distance to raise the coffee grounds basket 21 above the top of said coffee pot 30.

Figure 2:
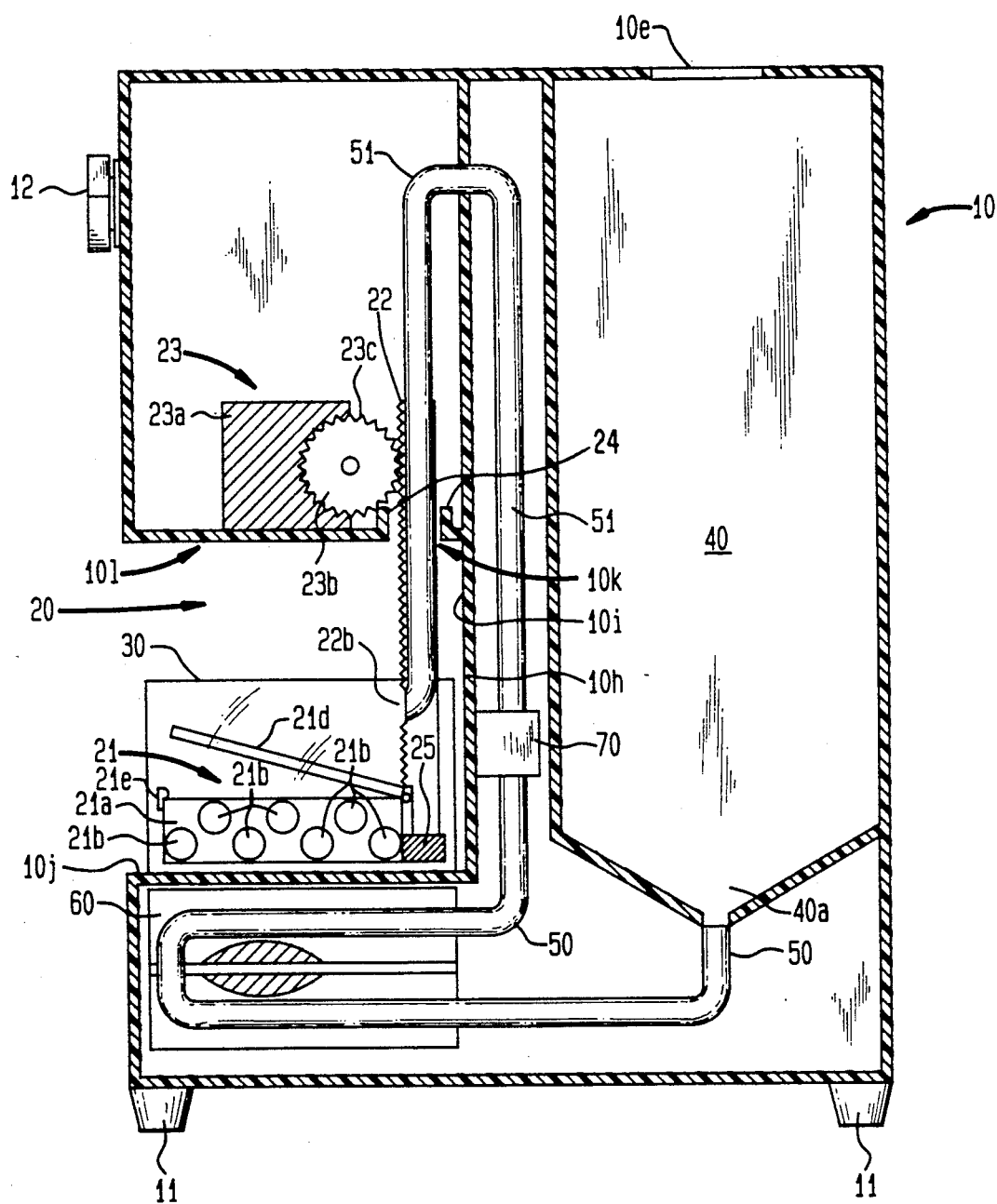
FIG. 2 is a cross-sectional view taken along line A-A of FIG. 1

Referring now to FIG. 2, which is a cross-sectional view of the coffee maker 1 taken along line A-A of FIG. 1, it can be seen that water storage receptacle 40 is disposed within the rear wall 10a of said housing member 10 adjacent to the opening 10e formed in the top surface of said top wall 10b. The lower end of said water storage receptacle 40 contracts into a funnel 40a having a first tubing member 50 attached to the opening of said funnel 40a. The first tubing member 50 extends from said water storage receptacle 40 to an electrical heating element 60 in two-pass heat exchanger relationship, continuing therefrom to the entrance port of water pumping means 70 fixedly attached to the inward side 10h of the forward surface 10i of said vertical wall 10a. Said heating element 60 is disposed adjacent to the top surface 10j of the bottom wall 10c of said housing member 10, thereby providing means to heat water disposed in said coffee pot 30. A second tubing member 51, preferably formed from flexible tubing, communicates with the exit port of said water pumping means 70 and continues therefrom to the interior of the hollow traveling rod 22 terminating at the water port 22b of said traveling rod 22.

In addition to the aforementioned coffee grounds basket 21 and traveling rod 22, coffee grounds receptacle unit 20 includes a rotating gear mechanism 23 comprising a gear motor 23a and a gear wheel 23b rotatably attached to said gear motor 23a. Traveling rod 22 extends through an opening 10k formed in the bottom surface 101 of said top wall 10b and is embraced by rod guide supports 24 fixedly attached to the bottom surface 101 of said top wall 10b about said opening 10k. Rod 22 is attached to said coffee grounds basket 21 by means of a horizontally extending block snug 25 fixedly attached to the rear portion of said coffee grounds basket 21. The gear wheel 23b of said rotating gear mechanism 23 is formed with circumferential teeth 23c which engage the teeth 22a of said traveling rod 22, thereby causing the raising and lowering of said traveling rod 22 by selective rotation of said gear wheel 23b. In an alternative embodiment of the gear mechanism 23, the gear motor 23a oscillates the gear wheel 23b in a manner to move the traveling rod 22 and attached basket 21 rhythmically up and down within the pot 30.

The coffee maker 1 of the present invention is preferably wired for automatic operation. With the water storage receptacle 40 filled with water and the coffee grounds basket 21 filled with the appropriate amount of coffee grounds (depending upon the amount of coffee desired), the timer 13 is set and the coffee maker 1 is activated by operation of the switch 12. Thereby the coffee grounds basket 21 is lowered into the coffee pot 30 and the water pumping means 70 is activated to pump water from the water storage receptacle 40 to coffee pot 30. The heating element 60 brings the water contained in the coffee pot 30 to a boil while the coffee grounds basket 21 is disposed within said coffee pot 30 thereby providing means to prepare coffee by steeping the grounds in boiling water which permits more of the coffee flavorings to be extracted from the grounds. In a coffee maker 1 having an oscillating gear mechanism 23 the basket 21 oscillates up and down within the pot 30 to further enhance extraction of the flavorings from the coffee grounds. The two-pass heat exchanger relationship of said heating element 60 and said first tubing 50 permits preheating of the water to be used for brewing the coffee. After the appropriate time the coffee grounds basket 21 is raised from the coffee pot 30 by automatic operation of the rotating gear mechanism 23.

While the coffee maker 1 of the present invention has been described in reference to a preferred embodiment, various changes and modifications may be made without departing from the spirit and scope of the present invention as held in the appended claims, and such changes and modifications are intended as part of the present invention.

Therefore in view of the foregoing I claim:

1. An automatic coffee maker comprising
a housing member having a hollow rear wall, a hollow top wall forwardly extending from the top portion of said rear wall, and a hollow bottom wall forwardly extending from the bottom portion of said rear wall in parallel alignment with said top wall;
a water storage receptacle disposed within said housing member which communicates at the top portion of said receptacle with an opening formed in the top surface of said hollow rear wall;
a heating element disposed in said bottom wall;
water pumping means disposed within said housing member;
a coffee grounds receptacle unit including a coffee basket having meshed filters formed in the sides of said basket in spaced relationship; a snap-fit coffee basket lid pivotally mounted to said basket; a hollow tube having teeth formed to one side of the outside surface of said tube and an opening formed at the lower portion of said tube, said tube extending vertically from said top wall and said basket being fixedly attached to the lower end of said tube; and a rotating gear mechanism which engages the teeth of said hollow tube to selectively raise and lower said basket;
a first length of tubing connected at one end to said water storage receptacle and at the opposite end to the ingress of said water pumping means via said heating element, said first length of tubing extending through said heating element in heat exchanger relationship;
a second length of tubing connected at one end to the egress of said water pumping means and at the opposite end to the opening formed in the hollow tube of said coffee grounds receptacle unit; and
a selectively removable coffee pot disposable on the bottom wall of said housing member.

2. A coffee maker as described in claim 1 wherein said rotating gear mechanism comprises a gear wheel having teeth which engage the teeth of said tube of said coffee grounds receptacle unit, and means to rotate said gear wheel.

3. A coffee maker as described in claim 2 wherein said means to rotate said gear wheel operates in a manner to oscillate said gear wheel.

4. A coffee maker as described in claim 1 wherein said first length of tubing extends through said heating element in a two-pass heat exchanger relationship.

5. A coffee maker as described in claim 1 wherein said meshed filters are formed from nylon.

* * * * *